United States Patent Office 3,002,769
Patented Oct. 3, 1961

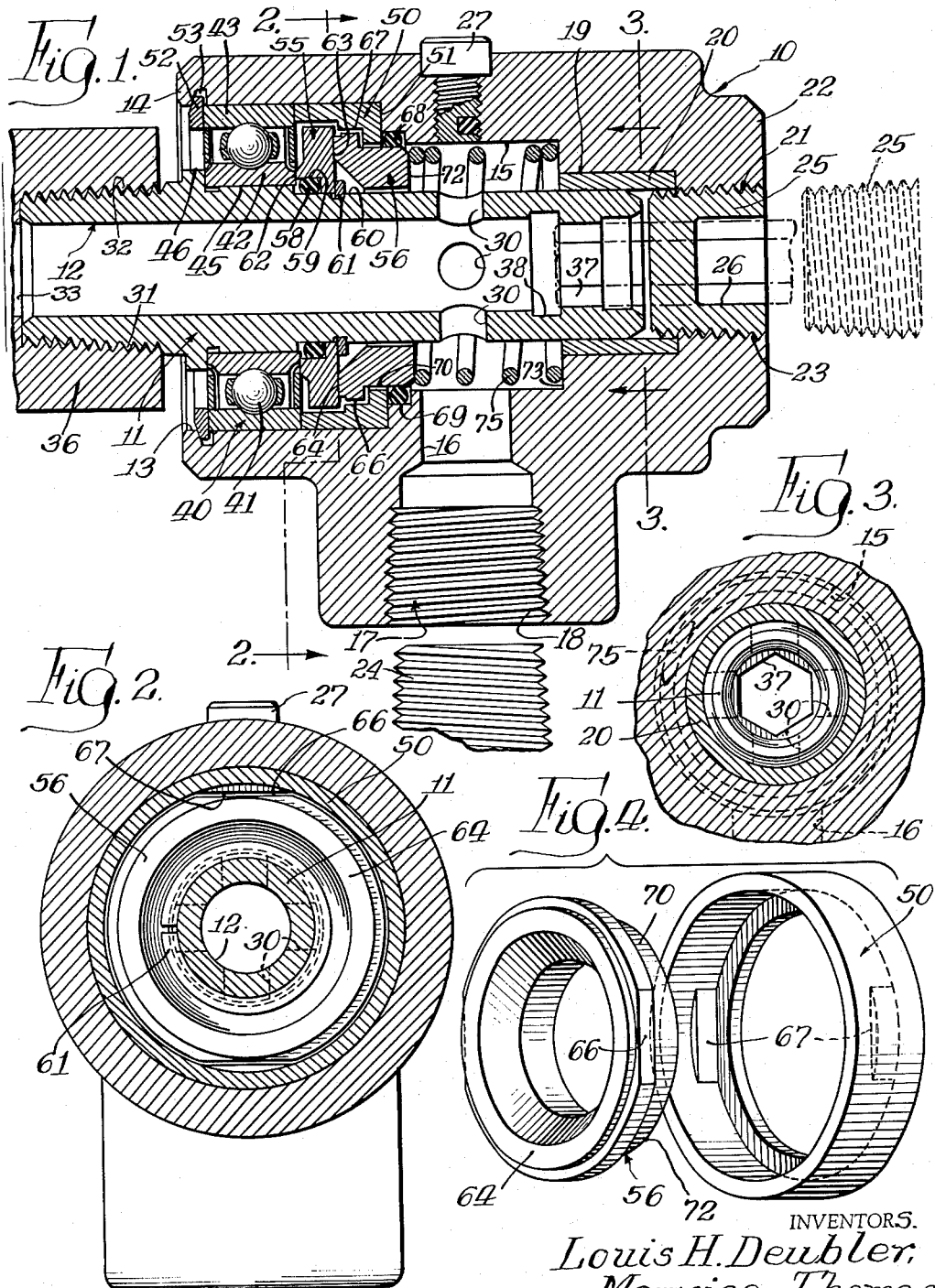

3,002,769
ROTARY UNION HAVING PARTICULAR ASSEMBLY MEANS
Louis H. Deubler and Maurice Thomas, Northbrook, Ill., assignors to Deublin Company, Glenview, Ill., a corporation of Illinois
Filed Jan. 2, 1958, Ser. No. 706,795
4 Claims. (Cl. 285—39)

Our invention relates to couplings, and more particularly to improvements in fluid conducting rotary unions intended to transmit pressurized fluids to rotating devices such as pneumatic and hydraulic clutches, air operated rotary chucks, or the like.

In brief, the present invention is directed to the class of rotating unions disclosed in Patent 2,723,136, issued November 8, 1955, to L. H. Deubler et al. and presents certain improved advancements over the device of that patent.

Generally speaking, the rotating union of the present invention is directed to a coupling device designed for high pressure with low torque characteristics, whereby compressed air or oil under pressure may be conducted to a rotating hollow shaft, rotating clutch hub, or other rotating fluid receiving member connecting with the fluid responsive device.

These rotating unions usually comprise an outer stationary housing in which is journaled an inner tubular rotor. One end of this tubular rotor projects from one end of the housing for attachment to the end of the hollow shaft, rotating clutch hub, or the like into which the fluid pressure is to be fed. This projecting end of the tubular rotor generally has threaded attachment to the rotating fluid receiving member, such as by a male thread on the projecting end of the tubular rotor screwing into a female thread within the fluid receiving member. The pressurized fluid enters the stationary housing and thence flows through the tubular rotor and enters the rotary fluid receiving member through this threaded joint.

One of the primary objects of the invention is to provide an improved arrangement for screwing this threaded joint together. Heretofore, the practice has been to form an external wrench receiving hexagon on the tubular rotor at a point between the end of the rotating fluid receiving member and the adjacent end of the stationary housing, as exemplified in the aforesaid Patent 2,723,136. The location of this wrench receiving hexagon at this point has necessitated that the stationary housing be spaced outwardly from the end of the rotating fluid receiving member, thereby increasing the distance that the rotating union projects outwardly from the end of the rotating fluid receiving member, which often prevents its use in cramped quarters. This outward spacing of the union housing also increases the overhang of the assembly beyond the end of the rotating fluid receiving member. Still further, in many hydraulically operated clutch installations it is the practice to use a rotating slinger or deflector at the outer end of the rotating clutch hub so as to deflect away from the clutch parts any oil which may leak out at the joint or union. This rotating slinger or deflector prevents the provision of such external wrench receiving hexagon on the tubular rotor unless the stationary housing of the union is spaced outwardly still further to accommodate both the slinger and the hexagon.

In our improved construction, all of the foregoing difficulties have been avoided by forming the opposite or inner end of the tubular rotor with an inner wrench engaging formation located within the stationary housing. The outer or adjacent end of the stationary housing is provided with an access opening for affording wrench access to this inner wrench engaging formation, which access opening is normally closed by a removable plug. This inner wrench engaging formation is preferably an internal hexagon socket for receiving an Allen type of wrench.

Another object of the invention, related to this feature of the inner wrench engaging formation, is to provide a rotating unit in which the fluid pressure supply line can be connected to the stationary housing alternatively, either in a "right-angle" coupling or in an "in-line" coupling, i.e. with the supply line connected either to the side of the stationary housing or to the end thereof substantially in alignment wtih the tubular rotor. The "in-line" coupling is effected through the aforesaid access opening.

Another object of the invention is to provide improved replaceable seal means for sealing the rotating joint where the tubular rotor projects out of the stationary housing. This seal means embodies an improved arrangement of readily interchangeable parts to facilitate servicing and repair of the union. The location of the wrench engaging formation within the stationary housing is advantageous in this regard because it means that there is then only one rotating joint to be sealed between the stationary housing and the tubular rotor.

The above and further objects, features, and advantages of our invention will be apparent to those familiar in the art from the following detailed description of one preferred embodiment of its concepts and improvements, as found in the accompanying drawings.

In the drawings:

FIGURE 1 is an axial sectional view taken substantially along the longitudinal center line of a union coupling embodying our invention;

FIGURE 2 is a cross-sectional view taken substantially along line 2—2 of FIGURE 1 and looking in the direction of the arrows thereon;

FIGURE 3 is a partial sectional view taken substantially at line 3—3 of FIGURE 1 and looking in the direction of the arrows thereon to demonstrate particulars of an improved wrench engaging means associated with the rotor of the union; and FIGURE 4 is an enlarged exploded perspective view of an improved seal and guide means employed in the union of this invention.

Turning now to the features and aspects of the improved coupling and rotating union of this invention, reference is made specifically to FIGURE 1 of the drawings wherein the device is shown as comprising a substantially T-shaped stator housing 10, preferably constituting a forged aluminum alloy which may be likened to a stator, since the same remains stationary in the operation of the union. A substantially cylindrical rotor, indicated generally by numeral 11, is mounted internally of the stator housing 10 and such is equipped with an internal, axial, fluid conductive passageway 12 extending substantially throughout its length.

Housing 10 includes an enlarged cylindrical counterbore 13 opening inwardly from one end 14 thereof and communicating with a smaller cylindrical counterbore 15 having a diameter somewhat smaller than the diameter of bore 13. Opening into one side of counterbore 15 is a transversely related cylindrical inlet chamber 16 communicating with an inlet throat portion 17, the latter having internal threads 18 for connection with a suitable supply conduit or pipe communicating with a source of pressurized fluid, such as compressed air, such supply pipe being represented by the thread 24 which is either on the end of the supply pipe or on a coupling nipple carried by the supply pipe. Counterbore 15 also communicates with a secondary axial bearing chamber or bore 19 disposed coaxially of the counterbores 13 and 15 and carrying an annular sleeve-type bearing member 20 for rotatably supporting one end of rotor 11. The bearing chamber 19 in turn coaxially communicates with an access opening or plug chamber 21 extending inwardly of end 22 on the housing 10; such access or plug chamber 21 having internal threads 23 for threadingly engaging external pipe threads of a pipe plug 25.

Plug 25, in turn, is distinguished by a hexagonal wrench socket or chamber 26 opening inwardly of one end thereof for engagement by a suitable Allen wrench, or like tool. When the plug 25 is disposed in the plug chamber 21, end 22 of the housing 10 is thereby closed over and sealed off from the internal chambering of the housing, constituting bores and chambers 13, 15, 16, 17 and 19, for example. Plug 25 also may be placed in the threaded inlet throat portion 17, if desired, thereby converting access opening 21 into an inlet opening for receiving the coupling on the fluid pressure line 24, when the aforementioned "in-line" type of coupling is desired. Another plug 27 is provided opposite inlet 16 for providing diametrically opposite points of access for inserting spring hold back tools for temporarily holding back the compression spring 75 when assembling or removing the rotor or seal, as will be later described.

The rotor 11 constitutes a tubular member having a substantially lengthwise extending cylindrical and axial bore or passageway 12 therein, as previously mentioned. Opening radially into axial bore 12 are four diametrically opposed openings 30, 30 located adjacent the inner end of the rotor and disposed suitably to communicate directly with the counterbore chamber 15. The presence of the openings 30 permits the passage of pressurized fluids from the supply inlet chamber 16 and the counterbore chamber 15 to the internal passageway 12 of the rotor. The outer end of the rotor is provided with suitable external threads 31, which may constitute either a standard pipe or machine screw type of thread, for screwing into a female thread 32 opening into an axial bore 33 of a rotating shaft, spindle, drum, coupling, or other rotating fluid receiving element 36 which is adapted to receive the compressed air, oil, water, or like fluid transmitted by the union of our invention. The male and female relationship of the threads 31 and 32 may be reversed, if desired. Heretofore, the threads 31 and 32 were screwed together by providing the rotor 11 with an external wrench receiving hexagon at a point between the end of the union housing 10 and the end of the rotating fluid receiving member 36, with the attendant disadvantages previously described.

These disadvantages are avoided in our improved construction by forming the axially innermost end of the rotor 11 with a suitable hexagonal wrench receiving socket 37 coaxial of the longitudinal passageway 12 and communicating therewith by means of an interposed counterbore portion 38. It will be readily appreciated that when the pipe plug 25 is removed from the pipe chamber 21, an Allen wrench may be inserted into the socket 37 to engage the rotor. The rotor may thus be held or rotated manually to engage threads 31 with the internally threaded end of spindle 36. Once the rotor 11 has been so coupled to the spindle means 36, replacement of the plug member 25 serves to seal over the end 22 of housing 10 and restore the fluid tight integrity thereof.

As mentioned previously the innermost end of rotor 11 is received and supported by a sleeve-type bearing 20 disposed in the bearing subchamber 19 of the housing. Additional bearing means, indicated by numeral 40 and constituting a single row of ball bearing members 41 held between inner and outer annular races 42 and 43, respectively, is mounted at the mouth of the large bore 13 of the housing. While the outer race 43 seats on the internal walls of chamber bore 13, the inner race 42 thereof fits tightly over an annular shoulder portion 45 formed adjacent the outer end of the tubular rotor 11 and immediately adjacent a radially outwardly extending stop shoulder 46. Shoulder 46 serves as an axial stop for locating the rotor axially with respect to the bearing means 40, as will best be understood by examining FIGURE 1 of the drawings. The inner or opposite end of the race member 43 abuts tightly against a stationary annular seal guide 50 disposed in chamber or bore 13 in abutting relation with shoulder 51 therein. With this arrangement, axial thrust in one direction on the bearing means 40 is transmitted through the seal guide 50 to shoulder 51 of the housing, and in the opposite direction to a snap ring member 52 mounted in an annular recess 53 formed in the side walls of housing chamber 13.

In addition to the ball bearing means 40 and the seal guide 50, chamber 13 also contains an annular rotatable seal member 55 and an annular stationary seal member 56. Seal member 55 is mounted for rotational movement with the tubular rotor 11 over an O-ring seal 58 mounted between an inset shoulder portion 59 thereof and the outside surface 60 of the rotary member 11 immediately adjacent the shoulder 45 thereof. A snap ring 61 is employed to hold the rotatable seal member 55 in position against the bearing means 40 whereby a projecting end face 62 thereon engages the end wall of inner race ring 42. The rotatable seal member 55 further presents a substantially planar annular lapped face 63 for engaging an opposing annular face 64 of the stationary seal member 56.

The annular stationary seal ring 56 is mounted within the seal guide member 50 and includes flattened locking faces 66, 66 on opposite sides thereof which engage internal locking shoulders 67 of the guide member. Such faces 66 and shoulders 67 serve to restrain the seal member 56 against rotation with the rotor 11 which it surrounds. An additional O-ring seal 68 is provided between an inwardly set annular recess 69, disposed substantially at the junction of bores 13 and 15, and the exterior cylindrical surface 70 of the seal member 56. This relationship may best be understood by examining FIGURE 1 of the drawings.

In order to assure proper sealing contact between the engaged seal faces 63 and 64 of the rotatable and stationary seal members, such surfaces are carefully lapped and a coil spring means 75 is mounted between the inner axial end 72 of the stationary seal member 56 and wall 73 which defines the inner axial end of the chamber bore 15.

Preferably, the rotatable seal member 55 constitutes oil hardened steel, and the stationary seal member 56 is preferably made of bronze in those instances of installation where hydraulic service is to be coupled through our union. If pneumatic devices are to be supplied, a carbon graphite seal is substituted for the metal stationary seal member 56. In either event, however, the inter-engaging faces 63 and 64 of the two seal members are micro-lapped and fitted for accurate sealing engagement. The presence of the O-ring seals 58 and 68 adequately protect against leakage around the running seal members 55 and 56 and balance of pressures is assured by proper proportioning of the end surfaces of the seal members. Hydraulic or pneumatic balance of such seal members 55 and 56 is important to provide minimum starting and running torque and to assure a long, leak-proof service. A union constructed according to these concepts and principles adequately operates with complete satisfaction at 2500 r.p.m., and with either 2000 p.s.i. for hydraulic service or 150 p.s.i. air service.

With the improved wrench engaging socket means provided internally of the housing 10 for engaging and holding the rotor 11, our coupling or union may be quickly attached to and detached from the driven member 36. Additionally, and of great benefit is the easy removability of the rotor assembly provided by the snap ring means 52. Thus the rotor assembly may be quickly removed as a unit for quick replacement of the rotating seal assembly comprising elements 55 and 56. This replacement of the seal and rotor is undertaken readily in the field with ease and facility, and thus the present union coupling is a marked advancement over previously known couplings of this type.

From the foregoing, it is believed that those familiar with the art will readily recognize and appreciate the improved advancements which mark our present invention. Further, while we have herein described and shown the same in conjunction with preferred embodiment, it is obvious that numerous changes, modifications, and substitutions of equivalents may be made therein without necessarily departing from the spirit and scope of our invention. As a consequence, it is not our intention to be limited to the particulars hereinabove set forth except as may appear in the following appended claims.

We claim:

1. In a fluid transmitting rotary union of the class described adapted for mounting upon any form of self-supported rotating fluid container having at one end thereof a coaxially aligned fluid inlet hub provided with a conventional internal mounting thread therein, said rotary union being in the form of a separate, independent accessory constituting no part of the bearing structure for supporting the rotating fluid container and comprising the combination of: a relatively stationary T-shaped housing having an axial bore therein extending horizontally therethrough from end to end, an in-line fluid inlet port opening axially into the outer end of said T-shaped housing in alignment with the outer end of said axial bore and communicating therewith, a right-angle fluid inlet port opening into the intermediate branch portion of said T-shaped housing and communicating with an intermediate portion of said axial bore, identical internal threads formed in both said in-line inlet port and in said right-angle inlet port, a fluid supply pipe having at one end thereof an external thread which matches with said identical internal threads for enabling said fluid supply pipe to be screwed alternatively either into said in-line port or into said right-angle inlet port, a closure plug having an external thread thereon identical with the external thread on said supply pipe for enabling said closure plug to be screwed into either said in-line inlet port or said right-angle inlet port, depending upon which of said inlet ports is not coupled up with said supply pipe, a tubular rotor rotatably supported in said axial bore and having an axial fluid conducting passageway extending therethrough from end to end, the outer end of said tubular rotor terminating in the outer portion of said housing with its axial bore in alignment with said in-line inlet port for transmitting fluid supplied to said in-line inlet port when said supply pipe is connected therewith, transverse holes in said tubular rotor establishing communication between said right-angle inlet port and the axial fluid passageway through said tubular rotor for transmitting fluid supplied to said right-angle inlet port when the supply pipe is connected therewith instead of with said in-line inlet port, the inner end of said tubular rotor projecting slightly beyond the inner end of said T-shaped housing, an external mounting thread formed on such projecting inner end of the rotor and adapted to be screwed into the internal mounting thread provided in the fluid inlet hub of said rotating fluid container, said external mounting thread on the tubular rotor being located in immediate proximity to the inner end of said T-shaped housing to minimize the overhanging weight of said T-shaped housing and said supply pipe connected therewith, resulting from both extending outwardly in cantilever relation beyond the end of the fluid inlet hub of said rotating fluid container, said T-shaped housing affording no bearing support for said rotating fluid container irrespective of whether said supply pipe is connected with said in-line inlet port or with said right-angle inlet port, whereby in the mounted position of said rotary union on said rotating fluid container said T-shaped housing can be rotated about the axis of said tubular rotor to face its right-angle inlet port at any desired vertical, horizontal or intermediate angle for accommodating different crowded installations by permitting said right-angle inlet port to be turned to accommodate any desired angle of approach of said supply pipe for direct threaded connection into said right-angle inlet port, a plain sleeve bearing interposed between the outer end of said tubular rotor and the outer portion of said T-shaped housing adjacent to said in-line inlet port, a counterbore in said T-shaped housing coaxial with said axial bore therein and extending from an inner closed end adjacent to said sleeve bearing to an outer open end at that end of said housing adjacent to said rotating fluid container, an antifriction ball bearing interposed between the inner wall of said counterbore and said tubular rotor substantially at said inner end of said housing, cooperating stationary and rotating sealing members in said counterbore in such position as to prevent fluids entering either through said in-line inlet port or through said right-angle inlet port from having access to said anti-friction ball bearing and thence escaping outwardly to atmosphere through said ball bearing and the open end of said counterbore, a helical compression spring encircling said tubular rotor within said counterbore for holding said sealing members pressed resiliently together, an internal hexagonal Allen wrench type of through-socket in the outer end of said tubular rotor for establishing fluid transmitting communication between said in-line inlet port and the axial passageway in said tubular rotor, and operative during installation of said rotary union to receive the end of a conventional Allen wrench inserted through said in-line inlet port for manually rotating said tubular rotor to screw the external mounting thread on the inner end of said rotor into mounting relation within the internal mounting thread in the inlet hub of said rotating fluid container, and an internal hexagonal Allen wrench type of socket opening in the outer face of said closure plug of the same size as the hexagonal through-socket in the outer end of said tubular rotor for receiving the same Allen wrench for screwing the closure plug into that inlet port with which the supply pipe is not connected.

2. A fluid transmitting rotary union as defined in claim 1, wherein a snap ring is provided having releasable locking engagement within an internal groove in said counterbore beyond said anti-friction ball bearing, and wherein the parts are so constructed and arranged that upon the release of such snap ring the entire assembly, comprising the tubular rotor, anti-friction ball bearing, stationary and rotating sealing members, and helical compression spring, can all be removed from the same end of said T-shaped housing out through said counterbore.

3. In the fluid transmitting rotary union, in the form of a separate independent accessory for mounting upon different forms of self-supporting rotating fluid containers, wherein the sole function of said rotary union is to establish fluid communication with said fluid containers independently of any supporting function for such containers, which fluid containers conventionally have an axially aligned fluid inlet hub provided with a conventional mounting thread, said fluid transmitting rotary union comprising the combination of an outer relatively stationary housing having an axial bore therein, an in-line fluid inlet port opening axially into one end of said housing in alignment with the outer end of said axial bore, a right-angle fluid inlet port opening into an intermediate portion of said housing, identical internal threads formed in both said in-line inlet port and in said right-angle inlet port, a fluid supply pipe provided with an external thread which matches with said identical internal threads for enabling said fluid supply pipe to be screwed alternatively into either said in-line port or into said right-angle inlet port, depending upon installation requirements, a closure plug having an external thread thereon identical with the external thread carried by said supply pipe for enabling said closure plug to be screwed into either said in-line inlet port or into said right-angle inlet port, for closing off whichever inlet port is not coupled up with said supply pipe, a tubular rotor rotatably mounted in said axial bore and having an axial fluid conducting passageway extending therethrough from end to end, the outer end of said tubular rotor communicating with said in-line inlet port for transmitting the fluid supplied to said in-line inlet port when said supply pipe is connected therewith, fluid conducting passage means establishing communication between said right-angle inlet port and the axial fluid passageway through said tubular rotor for transmitting the fluid supplied to said right-angle inlet port through said tubular rotor when the supply pipe is connected to said right-angle inlet port, the inner end of said tubular rotor projecting slightly beyond the inner end of said outer housing, a companion mounting thread carried by such projecting inner end of the rotor and adapted to have threaded engagement with the conventional mounting thread carried by the fluid inlet hub of said rotating fluid container, said companion mounting thread on the tubular rotor being located in close proximity to the adjacent end of said outer housing, said outer housing being capable of rotation about the axis of said tubular rotor after said mounting threads have been screwed together, so that said outer housing can be revolved to any desired angular position for placing its right-angle inlet port in position to receive said supply pipe with the latter approaching the rotating union at whatever angle best meets the requirements of the individual installation, separate bearing means supporting opposite ends of said tubular rotor in said outer housing, one of said bearing means comprising an antifriction ball bearing, co-operating stationary and rotating sealing rings so positioned in said housing as to prevent the fluid entering either through said in-line inlet port or through said right-angle inlet port from having access to said antifriction ball bearing, said sealing rings having end abutting sealing faces, spring means for normally holding said sealing faces pressed resiliently together, an internal hexagonal Allen wrench type of through-socket in the outer end of said tubular rotor for establishing fluid transmitting communication between said in-line inlet port and the axial fluid connecting passageway in said tubular rotor, and also operative during the installation of said rotary union to receive the end of a conventional Allen wrench inserted through said in-line inlet port for manually rotating said tubular rotor to screw the companion mounting thread carried on the inner end of said tubular rotor into threaded engagement with the conventional mounting thread carried by the inlet hub of said rotating fluid container, and wrench receiving means on said closure plug by which the closure plug can be screwed into that inlet port with which said supply pipe is not connected.

4. A fluid transmitting rotary union as defined in claim 3, wherein said outer housing has an enlarged counterbore opening into one end thereof, and has a releasable snap ring engaging in an internal groove in said counterbore for releasably closing the outer end of said counterbore, and wherein the parts are so constructed and arranged that upon the release of such snap ring the entire assembly comprising the tubular rotor, antifriction ball bearing, stationary and rotating sealing members and coacting compression spring can all be removed out through the open end of said counterbore.

References Cited in the file of this patent
UNITED STATES PATENTS

| | | |
|---|---|---|
| 652,789 | Leitelt | July 3, 1900 |
| 1,164,704 | Courembis | Dec. 21, 1915 |
| 1,532,774 | Page | Apr. 7, 1925 |
| 1,968,872 | Campbell | Aug. 7, 1934 |
| 1,992,750 | Jensen | Feb. 26, 1935 |
| 2,101,938 | Giberson | Dec. 14, 1937 |
| 2,331,615 | Meyer | Oct. 12, 1943 |
| 2,333,349 | Weatherhead | Nov. 2, 1943 |
| 2,384,281 | Carter | Sept. 4, 1945 |
| 2,462,006 | Schmitter | Feb. 15, 1949 |
| 2,565,791 | Wagner | Aug. 28, 1951 |
| 2,653,837 | Voytech | Sept. 29, 1953 |
| 2,701,146 | Warren | Feb. 1, 1955 |

FOREIGN PATENTS

| | | |
|---|---|---|
| 57,426 | Germany | July 11, 1891 |
| 297,173 | Great Britain | Sept. 20, 1928 |
| 1,072,574 | France | Mar. 17, 1954 |

UNITED STATES PATENT OFFICE
CERTIFICATE OF CORRECTION

Patent No. 3,002,769                            October 3, 1961

Louis H. Deubler et al.

It is hereby certified that error appears in the above numbered patent requiring correction and that the said Letters Patent should read as corrected below.

In the heading to the drawings, line 2, and in the heading to the printed specification, lines 2 and 3, title of invention for "ROTARY UNION HAVING PARTICULAR ASSEMBLY MEANS", each occurrence, read -- ROTATING UNION HAVING PARTICULAR ASSEMBLY MEANS --; column 1, line 11, column 5, lines 19, 24, and 75, column 6, lines 32, 43, 54, and 57, and column 8, lines 3 and 13, for "rotary", each occurrence, read -- rotating --.

Signed and sealed this 19th day of June 1962.

Attest:

ERNEST W. SWIDER
Attesting Officer

DAVID L. LADD
Commissioner of Patents